United States Patent [19]

Nunokawa

[11] Patent Number: 4,684,141
[45] Date of Patent: Aug. 4, 1987

[54] PORTABLE CART

[76] Inventor: Tadao Nunokawa, 252 Fairview Ave., Cedar Grove, N.J. 07009

[21] Appl. No.: 839,471

[22] Filed: Mar. 12, 1986

[51] Int. Cl.$^4$ ............................................. B62B 1/04
[52] U.S. Cl. ...................................... 280/40; 280/42; 280/655
[58] Field of Search ............... 280/645, 646, 655, 654, 280/652, 42, 38, 39, 40

[56] References Cited

U.S. PATENT DOCUMENTS

| | | | |
|---|---|---|---|
| 1,244,506 | 10/1917 | Kirk | 280/655 |
| 2,395,275 | 2/1946 | Jackson | 280/655 |
| 3,558,157 | 1/1971 | Neumann | 280/652 |
| 3,612,563 | 10/1971 | Kazmark | 280/655 |
| 4,128,252 | 12/1978 | Raniero | 280/655 |
| 4,281,849 | 8/1981 | Chandrick | 280/655 |
| 4,294,463 | 10/1981 | Kotani | 280/646 |
| 4,540,196 | 9/1985 | Paping | 280/646 |

FOREIGN PATENT DOCUMENTS 2497752  7/1982  France .................. 280/652

Primary Examiner—David M. Mitchell
Attorney, Agent, or Firm—Frank J. Jordan; C. Bruce Hamburg; Manabu Kanesaka

[57] ABSTRACT

A portable cart for carrying luggage comprises a central section, a handle section detachably connected to a rear portion of the central section, two side sections pivotally connected to the central section respectively and having at least one wheel rotationally connected to a rear portion of the side section, and a device for holding the side sections horizontally so that the upper portions of the side section and the central section are substantially located on the same plane. When the holding device is released, the side sections can rotate relative to the central section so that the side sections are substantially oriented perpendicular to the central section and parallel to each other. The handle section is formed of a plurality of elongated rods telescopically connected to each other so that when the handle section is used, the rods are extended upwardly from the central section to orient in order from a rod having largest diameter to a rod having a smallest diameter.

8 Claims, 9 Drawing Figures

PORTABLE CART

BACKGROUND OF THE INVENTION AND RELATED ART STATEMENT

The present invention relates to a portable cart for carrying luggage, more particularly a portable cart which can be folded to a very small size when not in use.

A portable cart or carrier for carrying luggage is widely known and used. The conventional portable cart can be folded to a relatively small size so that the cart can be easily carried when the cart is not used. However, the conventional portable cart is still generally large, even if folded. Therefore, only when a user is expected to carry a heavy or large material, a user bring the cart. It is not practical and comfortable to bring a folded cart at all times.

U.S. Pat. No. 3,612,563 discloses a collapsible suitcase carrier including a dolly assembly and an elongated handle connected to the dolly assembly. When the suitcase carrier is folded, the handle is detached from or folded relative to the dolly assembly, but the dolly assembly of itself can not be folded or collapsed. Therefore, the size of the suitcase carrier of the patent is still relatively large. It is not practical to bring the carrier at all times as well.

Accordingly, one object of the present invention is to provide a portable cart which can be folded or collapsed to a very small size when the cart is not used.

Another object of the present invention is to provide a portable cart as stated above, which can be easily assembled and folded.

A further object of the present invention is to provide a portable cart as stated above, which is light in weight.

A still further object of the present invention is to provide a portable cart as stated above, which can be easily and economically manufactured.

Further objects and advantages of the invention will be apparent from the following description of the invention.

SUMMARY OF THE INVENTION

In accordance with the present invention, a portable cart for carrying luggage comprises a central section, a handle section detachably connected to a rear portion of the central section, two side sections pivotally connected to the central section respectively and having wheels rotationally connected to the respective side sections, and means for holding the side sections horizontally so that upper portions of the side sections and an upper portion of the central section are substantially located on the same plane. When the holding means is released, the side sections can rotate relative to the central section. Consequently, the side sections can be substantially oriented perpendicular to the central section and parallel to each other.

The handle section is formed of a plurality of elongated rods telescopically connected to each other so that when the handle section is used, the rods are extended upwardly from the central section to orient in order from a rod having a largest diameter to a rod having a smallest diameter.

The holding means comprises first engaging devices fixed to the central section and second engaging devices fixed to the respective side sections. The second engaging devices are engaged with the first engaging devices when assembled so that a luggage support plane is formed on the upper portions of the central section and the two side sections. Preferably, the holding means further includes at lease one spring device situated in the central section. The spring device urges the side sections outwardly so that when the first and second engaging devices are engaged together, the second engaging devices on the side sections do not accidentally disengage from the first engaging devices.

The portable cart of the present invention may further comprises means for removably connecting the handle section to the central section. The handle section connecting means includes a first connecting device formed on the handle section and a second connecting device formed on the central section, the second connecting device engaging the first connecting device.

Preferably, the rods of the handle section include means for firmly connecting the rods with each other so that when the rods are extended, the rods do not rotate with each other. The rod having the smallest diameter is provided with a grip.

DETAILED DESCRIPTION OF PREFERRED EMBODIMENTS

Figure 1:
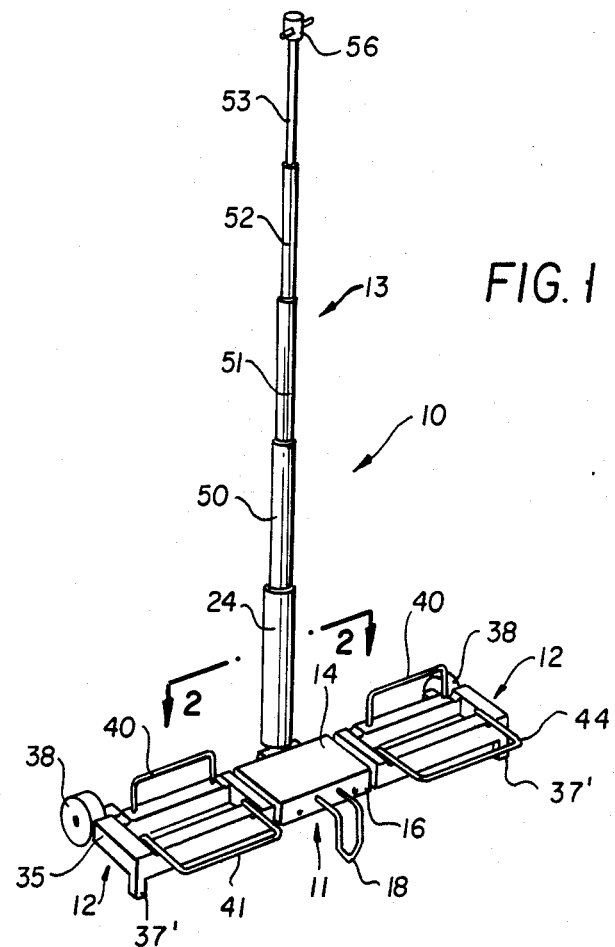
FIG. 1 is a perspective view of a portable cart in accordance with the present invention, wherein the portable cart is assembled for use.
Figure 2:
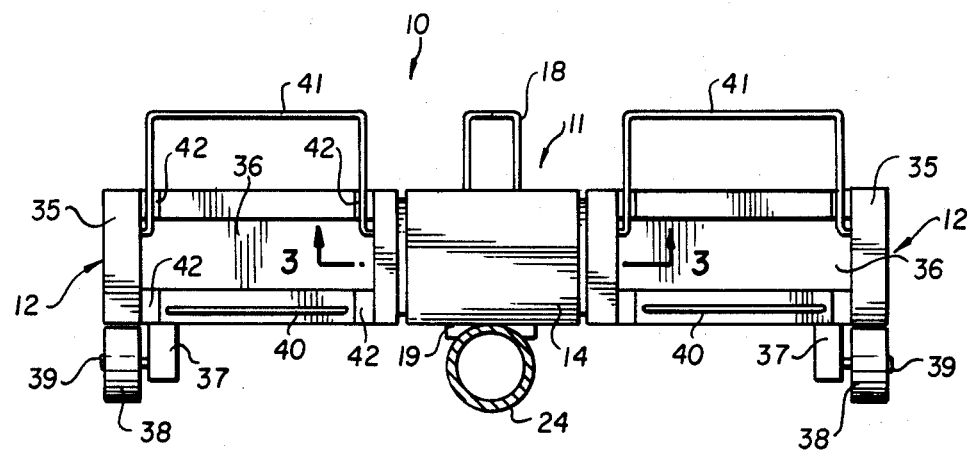
FIG. 2 is an enlarged section view taken along a line 2—2 in FIG. 1.
Figure 3:
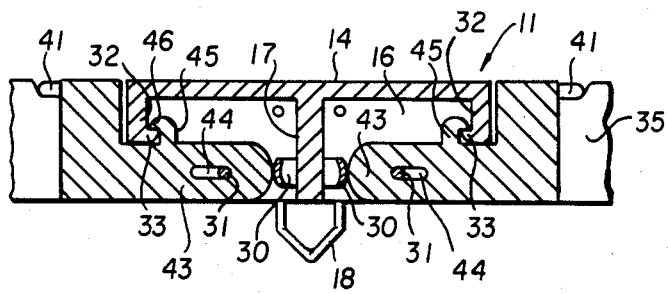
FIG. 3 is a partial section view taken along a line 3—3 in FIG. 2.
Figure 4:
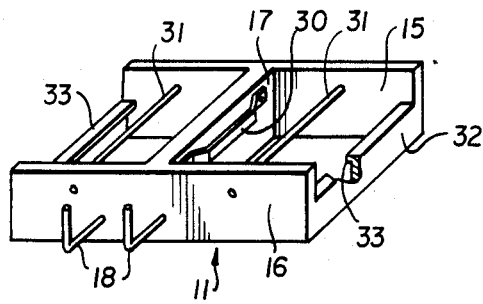
FIG. 4 is a perspective view of an inverted central section of the portable cart, wherein a part of the central section is cut.
Figure 5:
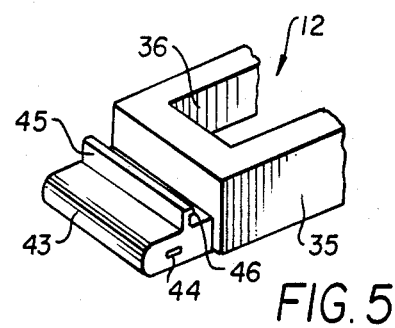
FIG. 5 is a partial perspective view of a side section of the portable cart.
Figure 9:
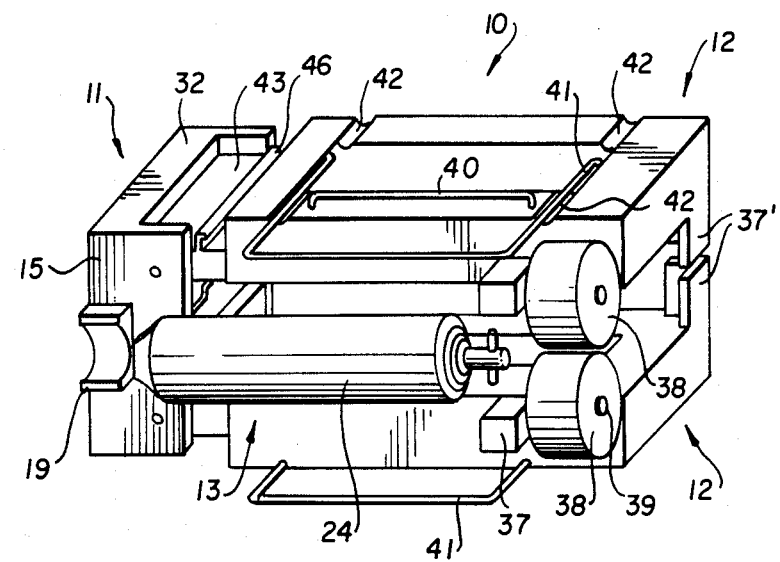
FIG. 9 is a perspective view of a portable cart, wherein the cart is folded to be easily carried.

Referring to FIGS. 1 and 9, a portable cart 10 in accordance with the present invention is assembled as shown in FIG. 1 for carrying luggage in use, while the portable cart 10 is folded as shown in FIG. 9. Since the cart 10 is very compact when folded, large space is not required to carry the cart 10. Therefore, it is easy to carry the cart 10 in the folded condition.

The cart 10 comprises a central section 11, two side sections 12 pivotally connected to the central section 11 and a handle section 13 detachably connected to the central section 11. When the cart 10 is folded, the side sections 12 are oriented perpendicular to the central section 11 and parallel to each other. The handle section 13 is detached from the central section 11, or the orientation thereof is changed as shown in FIG. 9.

As clearly shown in FIGS. 1, 3, 4 and 6, the central section 11 comprises an upper plate 14, a rear plate 15, a front plate 16 and a partition plate 17. The front plate 16 is provided with two holes for slidably receiving a part of an auxiliary support member 18. The support member 18 can be moved close to the front plate 16 when the cart 10 is folded, while the support member 18 can be moved or pulled away from the front plate 16 when the cart 10 is assembled. The auxiliary support member 18 operates to support and hold the central section 11 in the upright position.

Figures 6, 7:
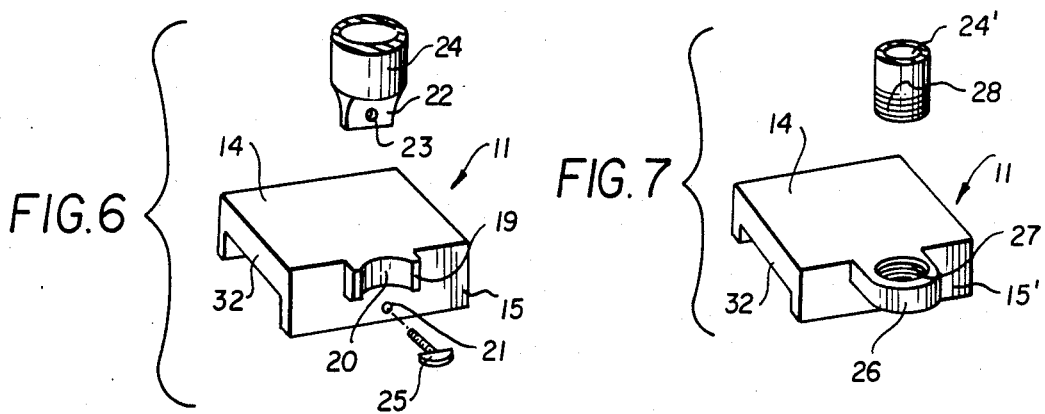
FIG. 6 is an exploded view of a first embodiment of means for removably connecting a handle section to a central section.
FIG. 7 is an exploded view of a second embodiment of means for removably connecting a handle section to a central section.

In the embodiment as shown in FIG. 6, the rear plate 15 is provided with a flange 19 with a curved portion 20, and a screw hole 21. In this embodiment, the handle section 13 is provided with a projection 22 with a hole 23 at a lower end of a cylindrical rod 24. The configuration of the curved portion 20 corresponds to the curvature of the rod 24. When the handle section 13 is securely fixed to the rear plate 15, the rod 24 is placed on the curved portion 20 of the flange 19. Then, a screw 25 is inserted into the hole 23 and is engaged with the screw hole 21. The screw 25 is tightened, so that the rod 24 of the handle section 13 is firmly fixed perpendicular to the central section. On the other hand, when the handle section is oriented downwardly for folding, the screw 25 is loosened. Consequently, the rod 24 can be disengaged from the flange 19 and oriented as desired.

In the embodiment as shown in FIG. 7, the rear plate 15' is provided with a flange 26 with a threaded hole 27. A cylindrical rod 24' of the handle section 13 includes male threads 28 at a lower end thereof. When the handle section is fixed to the flange 26, the male threads 28 is engaged with the threaded hole 27. The handle section can be securely fixed to the central section.

The partition plate 17 of the central section 11 is provided with two springs 30 for pushing the side sections outwardly when the cart 10 is assembled. Situated parallel to the partition plate 17 are shafts 31, which are supported between the rear plate 15 and the front plate 16. The shafts 31 pivotally support the respective side sections 12. The central section 11 is also provided with two side plates 32 with projections 33 extending toward the partition plate 17. The purpose of the spring 30 and the projection 33 is explained hereinafter.

The side sections 12 are symmetrically arranged relative to the central section 11. Each side section 12 is provided with a rectangular frame 35 having a central opening 36. Integrally connected to a rear portion of the frame 35 is a flange 37, to which a wheel 38 is rotationally fixed by means of a shaft 39. Also, a bottom support 37' is integrally connected to a bottom portion of the frame 35. The bottom support 37' holds the cart 10 in the upright position together with the wheel 38 when the cart 10 is situated on a ground.

A back support 40 is slidably fixed to the frame 35, and a bottom support 41 is rotationally fixed to the frame 35. The frame 35 includes four depressions 42 at an upper surface thereof. When the cart 10 is used, the back support 40 is pulled to the upper position, and the bottom support 41 is turned to be located at a front position, so that a back and a bottom of a luggage can be securely supported by the back support 40 and the bottom support 41 respectively. When the cart 10 is folded, the back support 40 is pushed to the lower position and the bottom support 40 is turned to be located at a rear position. Since the bottom support 41 is situated in the depressions 42 no matter whether the bottom support 41 is located in the front or rear position, the bottom support 41 is always located in the same plane as the upper surface of the frame 35.

Each side section 12 is provided with an engaging portion 43 integrally connected to the frame 35 and extending laterally therefrom. The engaging portion 43 is provided with an elongated through hole 44, which extends in the longitudinal direction of the frame 35 in cross section. Further, the engaging portion 43 includes an upper protrusion 45 integrally formed therewith to extend upwardly therefrom, the protrusion 45 having a projection 46 extending toward the frame 35.

The side section 12 is connected to the central section 11 so that the shaft 31 passes through the through hole 44, wherein although the through hole 44 is extended in the lateral direction, frame 35 is always pushed outwardly by means of the spring 30. As clearly shown in FIG. 3, when the side section 12 is assembled for use, the projection 46 of the protrusion 45 on the engaging portion 43 engages the projection 33 of the side plate 32 on the central section 11. Since the spring 30 pushes the side section 12 outwardly, the projection 46 does not disengage the projection 33. When the side section 12 is folded, the side section 12 is pushed toward the central section 11 and is turned about the shaft 31. Consequently, the projections 33, 46 disengage from each other to thereby permit the side section 12 to rotate about the shaft 31.

Figure 8:
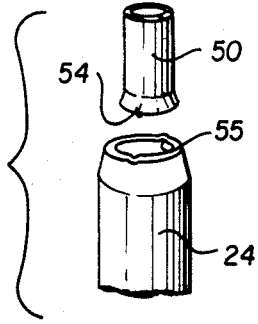
FIG. 8 is an exploded view of a part of rods of a handle section.

The handle section 13 includes rods 50, 51, 52 and 53 in addition to the rod 24. The diameter of the rods 24, 50, 51, 52 and 53 decreases in order so that the rods with small diameter can be successively and telescopically located inside the rods with large diameter. The lower ends of the rods 50, 51, 52 and 53 slightly extend outwardly and include small projections 54, while the upper ends of the rods 24, 50, 51 and 52 slightly extend inwardly and include small depressions 55, as shown, for example, in FIG. 8. Accordingly, when the rods are assembled properly, even if the rods are pulled upwardly, the rods do not disengage from each other. Further, when the rods are extended and the projections 54 and depressions 55 engage respectively, the rods do not rotate with each other. This is especially advantageous when the direction of the cart 10 is controlled by means of a grip 56 attached to the rod 53.

In this embodiment, the length of the rod 24 is slightly shorter than the length of the side section 12. Consequently, when the handle section 13 is folded, the handle section 13 can be placed adjacent the side sections 12.

In the portable cart 10 of the present invention, the side sections 12 and the handle section 13 can be firmly engaged with the central section 11 when the cart 10 is assembled for use. On the other hand, the assembled cart can be easily folded, wherein the size of the folded cart is very small. It is easy to carry the folded cart.

While the invention has been explained with reference to the specific embodiments of the invention, the explanation is illustrative and the invention is limited only by the appended claims.

What is claimed is:

1. A portable cart for carrying luggage, comprising:
   a central section having an upper portion and a rear portion,
   a handle section detachably connected to the rear portion of the central section, said handle section being formed of a plurality of elongated rods telescopically connected to each other so that when the handle section is used, the rods are extended upwardly from the central section to orient in order from a rod having a largest diameter to a rod having a smallest diameter,
   two side sections pivotally connected to the central section respectively, each side section having upper and rear portions, and at least one wheel rotationally connected to the rear portion of the side section, and means for holding the side sections horizontally so that the upper portions of the side sections and the upper portion of the central section are substantially located on the same plane, said holding means, when released, allowing said side sections to rotate relative to the central section so that the side sections are substantially oriented perpendicular to the central section and parallel to each other, said holding means comprising first engaging devices fixed to the central section, second engaging devices fixed to the respective side sections, said second engaging devices engaging the first engaging devices when assembled to form a luggage support plane on the upper portions of the central section and the two side sections, and at least one spring device situated in the central section, said spring device urging the side sections outwardly so that when the first and second engaging devices are engaged together, the second engaging devices on the side sections do not accidentally disengage from the first engaging devices.

2. A portable cart according to claim 1, in which said side sections include through holes respectively, each having laterally extended circular form in cross section, and said central section includes two support shafts extending through the through holes respectively so that the side sections are pivotable relative to the central section about the support shafts.

3. A portable cart according to claim 1, further comprising means for removably connecting the handle section to the central section, said handle section connecting means including a first connecting device formed on the handle section and a second connecting device formed on the central section engaging the first connecting device.

4. A portable cart according to claim 3, in which said first connecting device is male threads formed on the rod having the largest diameter, and the second connecting device includes a rod supporting portion formed on the central section, said rod supporting portion having a hole with female threads, the male threads of the rod engaging the female threads of the rod supporting portion.

5. A portable cart according to claim 3, in which said handle section connecting means further includes a screw engaging the central section, said first connecting device being a connecting projection with a hole, and said second connecting device being a flange having a form for immovably receiving the rod of the handle section, said screw, after the rod of the handle section is snugly placed on the flange, passing through the hole of the connecting projection of the second connecting device and engaging the central section.

6. A portable cart according to claim 3, in which said rods of the handle section include means for firmly connecting the rods with each other so that when the rods are extended, the rods do not rotate with each other, and the rod having the smallest diameter includes a grip at a top thereof.

7. A portable cart according to claim 6, in which said means for firmly connecting the rods are projections and recesses formed on the rods.

8. A portable cart according to claim 6, in which each side section includes a back support adapted to support a back of a luggage, said back support being slidably connected to the upper portion of the side section, and a bottom support adapted to support a bottom of a luggage, said bottom support being pivotally connected to the side section.

* * * * *